United States Patent [19]

Kreuz

[11] 4,067,356
[45] Jan. 10, 1978

[54] CHECK VALVE FOR LARGE CONDUITS

[76] Inventor: Alfred Kreuz, Hardterwaldstr. 148, 4050 Monchengladbach-Hardt, Germany

[21] Appl. No.: 622,381

[22] Filed: Oct. 14, 1975

[30] Foreign Application Priority Data

Oct. 19, 1974 Germany .............................. 2449857

[51] Int. Cl.² ............................................ F16K 15/03
[52] U.S. Cl. .................................. 137/527; 137/527.4; 137/527.8
[58] Field of Search .................. 137/527, 527.2, 527.4, 137/527.6, 527.8, 543.17, 543.19, 219; 251/298, 219, 228

[56] References Cited

U.S. PATENT DOCUMENTS

| 932,028 | 8/1909 | Koenig | 137/219 |
|---|---|---|---|
| 2,443,036 | 6/1948 | Hopkins | 251/228 |
| 2,912,001 | 11/1959 | Green | 137/543.19 X |
| 3,027,909 | 4/1962 | Swain | 137/219 |
| 3,520,324 | 7/1970 | Meregalli | 137/219 |

FOREIGN PATENT DOCUMENTS

843,484 7/1952 Germany .......................... 137/543.17

*Primary Examiner*—William R. Cline
*Attorney, Agent, or Firm*—Joseph A. Geiger

[57] ABSTRACT

A check valve for large conduits having a stationary, rearwardly open hollow valve core mounted inside an enlarged-diameter portion of the housing bore, a matching dish-shaped valve poppet carried by a pivot lever closing the forward end of the valve core in the open valve position in which the valve poppet is spaced a short axial distance from the valve seat, so that a rapid closing action is obtained, as soon as an incipient reverse flow enters the hollow valve core.

9 Claims, 1 Drawing Figure

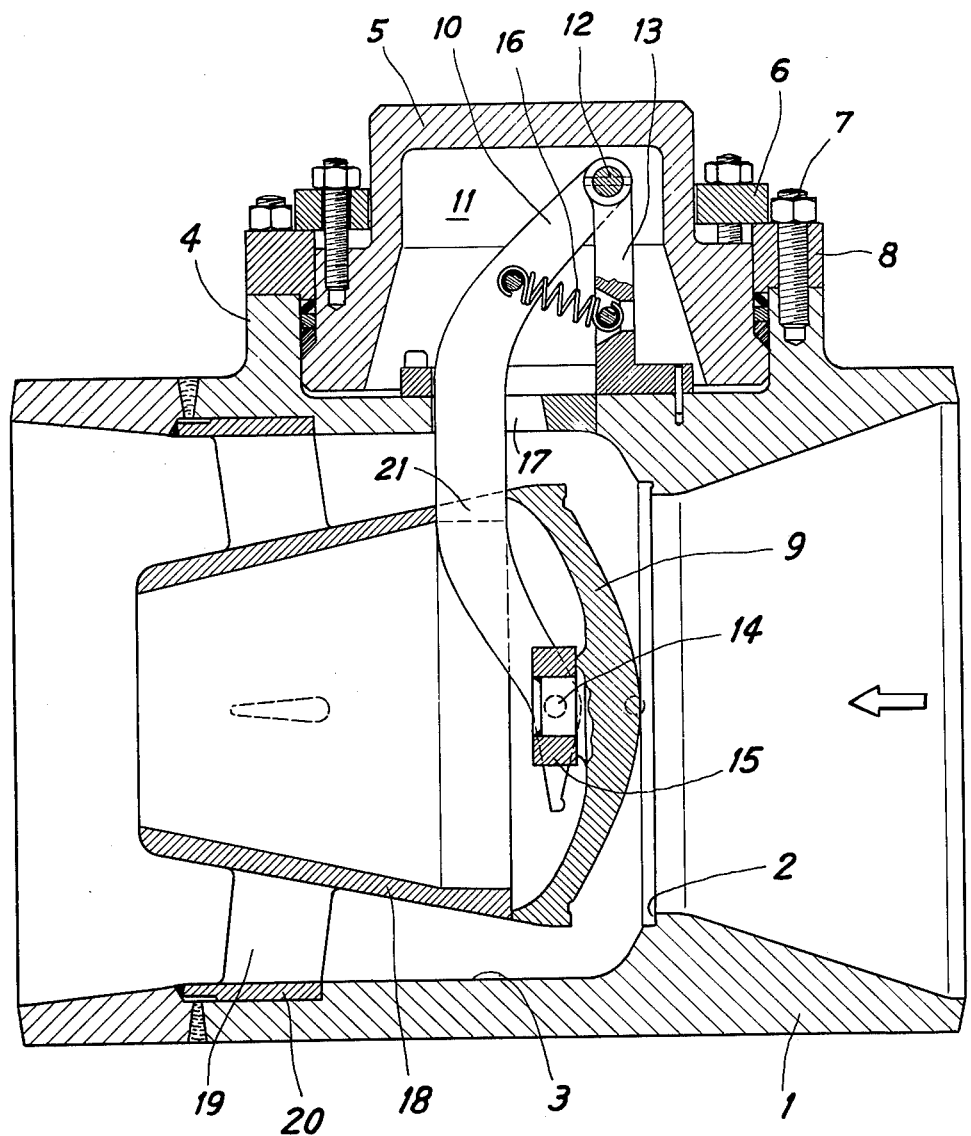

CHECK VALVE FOR LARGE CONDUITS

BACKGROUND OF THE INVENTION

1. Field of the Invention

The present invention relates to check valves and back pressure valves, and more particularly to check valves for large conduits where the inlet and outlet openings of the valve are axially aligned and the valve member moves axially in relation to the valve seat.

2. Description of the Prior Art

A check valve in a conduit system is designed to prevent the inversion of the liquid flow, should such an inversion become possible through the failure of the pipe, or through pump failure, for example. In the event of such failure, the check valve has to immediately close the conduit, in response to the cessation of flow, or in response to an incipient reverse flow. Ideally, the operation of a check valve should follow the first of the two conditions, but such an operation requires the presence of a closing bias derived from a spring or from gravity. Such a closing bias, however, will then act as a throttling force against the liquid flowing in the conduit.

In the case of a check valve responding to an incipient reverse flow of the liquid, it is of crucial importance that the response be as rapid as possible. It is well established that a liquid column moving in a pipe under pressure, when subjected to a sudden deceleration, is capable of developing considerable deceleration forces, sometimes as high as several times the operating pressure. Pressure surges of this type are generally undesirable, as they result in uncontrolled stress conditions in the pipe system, including pipe failure under certain extreme conditions.

Known check valves for large conduits are generally of the type featuring an enlarged-diameter housing portion, at the entrance side of which is arranged a radially inwardly narrowed valve seat, a matching axially movable valve member being positioned inside the enlarged-diameter housing portion. In one prior art solution, disclosed in British Pat. No. 336,870, the valve member has the outline of a drop, being carried by a pair of parallel links which are pivoted radially outside the valve diameter, inside a laterally extending head. A counterweight attached to the parallel links applies a closing bias to the valve member. Another prior art valve, described in British Pat. No. 304,751, has a shallow, dish-shaped valve poppet which, in the open position, cooperates with the forward end of a stationary core body to form a drop-shaped centrally located core assembly. The valve poppet is guided for axial motion in relation to the core body, a compression spring urging the valve poppet toward its closed position.

A major shortcoming of the first-mentioned valve is the large inertia of its moving parts. The second prior art valve, though featuring a greatly reduced closing inertia, requires the action of a closing spring. Other prior art solutions have valve members moving along an arc into the open valve position, the latter being located laterally outside the liquid flow. Their closing action is too slow to prevent the establishment of a substantial reverse flow. The result is a sharp pressure surge, when the valve member is closed against its seat.

The requirements in size and response speed of check valves for large conduits have been steadily increasing, due to higher flow speeds and higher operating pressures in the conduits. A good example of this trend is found in the field of thermal power plants, especially atomic power plants. A pipe failure in the main feed pipe of such a power plant, for instance, if not checked by appropriate check valves, can lead to very severe secondary damage in the pipe system. As a result, it has become the practice in this field to specify check valves having a response time of only a few milliseconds.

SUMMARY OF THE INVENTION

Underlying the present invention is the objective of providing an improved check valve for large conduits, the valve being designed for minimal flow resistance and for a rapid closing response.

The invention proposes to attain the above objective by suggesting a check valve with an elongated, generally tubular valve housing with axial inlet and outlet ends, a transversely oriented valve seat in the housing midportion, and an axially open stationary valve core mounted coaxially with an enlarged-diameter bore portion, a dish-shaped valve poppet being arranged in the axial space between the valve seat and the forward end of the valve core, for a short poppet movement between a normal, open positon in which the valve poppet is seated against the valve core covering its forward axial opening and a closed position in which the valve poppet is seated against the valve seat.

In the normal valve position, the liquid accordingly flows through the valve seat, against the open valve poppet, where it is diverted into the annular flow channel surrounding the valve core. After flowing past the stationary valve core, the liquid leaves the valve housing through the axial outlet. When an inversion of the liquid flow takes place, as in the case of a pipe failure, for example, a portion of the rearwardly entering liquid flow enters the open rear end of the valve core moving against the rear side of the valve poppet. This central reverse flow quickly moves the valve poppet against the valve seat.

A preferred embodiment of the invention further suggests that the movable valve poppet be guided by a pivot lever which extends radially outside the bore of the valve housing and which has its outer pivot point located inside a closed lateral head of the housing. The inner end of the pivot lever and the valve poppet thus execute a short arcuate motion, preferably of about 6°, approximating a straight-line axial motion between the open and closed valve positions. In this context, the invention further suggests a pivot connection between the inner extremity of the pivot lever and the valve poppet, thereby making it possible to arrange the valve seat, the valve core front face, and the cooperating front and rear sides of the valve poppet in parallel planes. For this purpose, the pivot lever may have a forked inner end portion, or it may be assembled from two parallel pivot arms, the valve poppet having preferably a central hub extending rearwardly between the arms of the pivot lever.

In the preferred embodiment of the invention, the valve poppet presents a dome-shaped axial contour extending in the direction of the valve seat, thereby smoothly parting and diverting the arriving liquid flow in the direction of the annular flow channel between the valve core and the valve housing.

As an additional advantageous feature, the invention suggests a pivot lever and valve poppet assembly with a combined center of gravity which is located downstream of a radial plane through the outer pivot point of the pivot lever. This means that in the case of a horizontal arrangement of the check valve the weight of the pivot lever produces a closing bias on the valve poppet. Such a closing bias can alternatively or additionally be obtained by means of a suitable spring engaging the pivot lever.

A preferred embodiment of the invention further features a valve core in the shape of a hollow frustum, the rear diameter of the core being smaller than its forward diameter, yet occupying a substantial portion of the housing bore, in order to allow a central reverse flow to immediately reach the valve poppet through the valve core, for a rapid closing action. The valve core is coaxially positioned inside the valve housing by means of a number of fins extending radially across the annular flow channel between the valve core and the housing wall.

BRIEF DESCRIPTION OF THE DRAWING

Further special features and advantages of the invention will become apparent from the description following below, when taken together with the accompanying drawing which illustrates, by way of example, a preferred embodiment of the invention represented in the sole figure as follows:

The drawing figure shows, in a longitudinal cross section, a check valve for large conduits in accordance with the invention.

DESCRIPTION OF THE PREFERRED EMBODIMENT

In the drawing is shown a check valve for large conduits, intended for high operating pressures. A generally tubular valve housing 1 has axial inlet and outlet openings suited for connection to matching extremities of a pipe system by means of connecting welds, for example. From the inlet side, the housing bore narrows progressively towards a valve seat 2 in the midportion of the housing. Behind the valve seat, the housing bore widens cup-like into an enlarged-diameter cylindrical portion 3. On one side of the housing is arranged a lateral head 4 communicating with the enlarged portion 3 of the housing bore. The lateral head is outwardly closed by means of a head cover 5, preferably of the self-sealing type, as is shown in the drawing. A retaining flange 8, bolted against the valve housing 1 by means of suitable fasteners 7, serves to position and retain the head cover 5. The latter is outwardly preloaded against the retaining flange 8 by means of a pressure ring 6.

A valve poppet 9, corresponding in its outer diameter to the diameter of the valve seat 2, is positioned axially behind the latter. A radially extending pivot lever 10 carries the valve poppet 9, the lever in turn being pivotably supported by its outer extremity on a fixed support 13 by means of a pivot pin 12. The pivot support 13 is mounted in the space enclosed by the lateral head 4 and its cover 5. Between the pivot support 13 and the pivot lever 10 is mounted a tension spring 16 which urges the pivot lever 10 and the attached valve poppet 9 against the valve seat 2. The purpose of this spring is to maintain the valve closed, as long as no liquid flow takes place in the pipe system.

The inner extremity of the pivot lever 10 is attached to the valve poppet 9 by means of a second pivot connection at 14, the pivot axis of the latter being parallel to that of the outer pivot pin 12. The inner pivot connection permits the poppet 9 to align itself with the valve seat 2 in the forward (closed) poppet position and with a matching forward face of a hollow valve core 18 in the rearward (open) poppet position. The two positions are spaced apart a short axial distance, for a quick closing action of the valve poppet 9. The outer pivot 12 is preferably so positioned that the axis of the inner pivot 14 intersects the valve center axis in both end positions of the valve poppet 9.

The pivot lever 10 has two laterally spaced arms at the pivot connection 14, as part of a forked inner lever portion. Alternatively, the entire pivot lever may be assembled of two laterally spaced parallel arms. The valve poppet 9 has a matching hub 15 extending rearwardly between the arms of the pivot lever 10. Suitable pins or shoulder bolts attach the pivot lever arms to the poppet hub 15.

The housing wall which separates the central housing bore from the cavity of the lateral head is preferably closed by means of a filler member, a slot 17 for the pivot lever movement remaining open. Two narrow slots are necessary in the case of a double-arm pivot lever.

In the center of the cylindrical portion 3 of the valve housing 1 is arranged a tubular valve core 18 in the shape of a hollow frustum. The valve core 18 is fixedly mounted in coaxial alignment with the housing bore, thereby forming a rearwardly widening annular flow channel with the latter. Both axial ends of the valve core 18 are open. However, the larger forward end of the valve core is normally covered by the retracted valve poppet 9, as can be seen in the drawing. The combined outer contour of these parts presents a smooth flow surface for the passing liquid.

The valve core 18 is mounted inside the valve housing 1 by means of a seating ring 20 to which the core is integrally attached through radial fins 19 extending across the annular flow space between the core 18 and the housing 1. The seating ring is suitably recessed in the housing wall. The pivot lever 10, which reaches into the center of the valve core 18, requires a corresponding slot 21 in the forward portion of the latter, two such slots being necessary for a double-arm lever.

The weight of the pivot lever 10, because of the rearwardly corved outline of the lever, tends to assist the tension spring 16 in maintaining the valve closed in the absence of liquid flow. For this purpose, the combined center of gravity of the lever 10 and of the poppet 9 is located downstream of a radial plane through the outer pivot 12 of the lever, when the valve poppet 9 is in the closed position.

It is obvious from the drawing and from the foregoing disclosure that it is possible to replace the pivot lever of the invention with other valve poppet guide means, such as a straight-line guide inside the stationary valve core 18. Also, it is not necessary that the valve housing has axially aligned openings as shown in the drawing; it is possible to accommodate the check valve of the invention inside an elbow-shaped or T-shaped valve housing.

It should therefore be understood that the foregoing disclosure describes only a preferred embodiment of the invention and that it is intended to cover all changes and modifications of the invention which fall within the scope of the appended claims.

I claim the following:

1. A check valve comprising in combination:
    an elongated, generally tubular valve housing, the housing bore having an axial inlet end and an axial outlet end adapted for connection to matching openings of a pipe system;

a valve seat defined by a radially inwardly narrowed midportion of the housing bore, in a plane transverse to the housing axis;

an enlarged-diameter bore portion in the housing immediately behind the valve seat;

a hollow stationary valve core positioned coaxially inside the enlarged-diameter bore portion, so as to form an annular flow channel therewith, the valve core having an open forward end facing the valve seat at an axial distance behind it and an open rearward end of a diameter which occupies a substantial portion of the housing bore, thereby forming an inner flow channel through the core, for a reverse flow;

a generally dish-shaped valve poppet arranged in the axial space between the valve seat and the forward end of the valve core, the valve poppet being movable between a normal open position in which it is seated against the forward end of the valve core, thereby covering said open end in the manner of a lid, and a closed position in which it is seated against the valve seat, following a closing motion resulting from a reverse flow of liquid through said inner flow channel; and means for guiding the valve poppet in its motion between the open and closed valve positions; and wherein the valve poppet guide means includes an elongated pivot lever engaging with one lever extremity the valve poppet and with the other lever extremity a fixed outer pivot point which is located radially outside the housing bore, so that the valve poppet is guided to execute a short arcuate motion approximating a straight-line axial motion between its open and closed positions; and the valve housing includes a closed, laterally extending head for the accommodation therein of said fixed pivot point of the pivot lever.

2. A check valve as defined in claim 1, wherein
the valve poppet and the pivot lever extremity by which it is engaged form an inner pivot connection parallel to the outer pivot connection of the valve lever; and the open forward end of the valve core and the valve seat are located in parallel planes.

3. A check valve as defined in claim 2, wherein
the valve poppet includes a rearwardly extending central hub;

the pivot lever is constituted by two laterally spaced arms engaging said hub on opposite sides thereof with the aid of pivot members; and the valve core has matching slots for the accommodation of the pivot lever arms.

4. A check valve as defined in claim 2, wherein
the relationship between the length of the pivot lever and the axial displacement of the valve poppet is such that a closing motion of the latter corresponds to approximately six degrees angular motion of the former.

5. A check valve as defined in claim 1, wherein
the valve poppet has a dome-shaped axially protruding contour presenting a flow-parting nose in the direction of the valve seat.

6. A check valve as defined in claim 5, wherein
the pivot lever and the valve poppet are so designed that their combined center of gravity is positioned a distance downstream of a radial plane through the outer pivot point, when the valve poppet is in the closed position.

7. A check valve as defined in claim 5, wherein
the valve poppet guide means further includes a spring engaging the pivot lever so as to urge the valve poppet towards its closed position.

8. A check valve as defined in claim 1, wherein
the valve core has a smaller diameter at its rearward end, the core having the shape of a hollow frustum.

9. A check valve as defined in claim 8, wherein
the valve core is attached to the housing by means of fins extending radially across said annular flow channel between the valve core and the housing wall.

* * * * *